US 9,193,632 B2

(12) United States Patent
Heuberger

(10) Patent No.: US 9,193,632 B2
(45) Date of Patent: Nov. 24, 2015

(54) ON THE PRODUCTION OF METAL-CERAMIC COMPOUNDS

(75) Inventor: Martin Heuberger, Saarbruecken (DE)

(73) Assignee: SURFACE IGNITER LLC, Chagrin Falls, OH (US)

( * ) Notice: Subject to any disclaimer, the term of this patent is extended or adjusted under 35 U.S.C. 154(b) by 251 days.

(21) Appl. No.: 13/133,778

(22) PCT Filed: Dec. 10, 2009

(86) PCT No.: PCT/DE2009/001734
§ 371 (c)(1),
(2), (4) Date: Sep. 2, 2011

(87) PCT Pub. No.: WO2010/066243
PCT Pub. Date: Jun. 17, 2010

(65) Prior Publication Data
US 2011/0305920 A1    Dec. 15, 2011

(30) Foreign Application Priority Data

Dec. 11, 2008   (DE) .................... 10 2008 061 308

(51) Int. Cl.
| | | |
|---|---|---|
| C04B 37/02 | (2006.01) | |
| B23K 1/00 | (2006.01) | |
| B23K 1/19 | (2006.01) | |
| B23K 3/047 | (2006.01) | |

(52) U.S. Cl.
CPC ............ *C04B 37/026* (2013.01); *B23K 1/0004* (2013.01); *B23K 1/0008* (2013.01); *B23K 1/19* (2013.01); *B23K 3/0471* (2013.01); *B23K 2203/16* (2013.01); *C04B 2237/121* (2013.01); *C04B 2237/365* (2013.01); *C04B 2237/405* (2013.01); *Y10T 428/12576* (2015.01)

(58) Field of Classification Search
USPC .............. 219/85.14, 85.15, 74, 58.22, 85.16, 219/118, 200, 262, 270, 548, 553, 50, 55, 219/63; 428/469–472; 29/592.1, 611; 228/122.1–124.7, 245–255
See application file for complete search history.

(56) References Cited

U.S. PATENT DOCUMENTS

| | | | | |
|---|---|---|---|---|
| 4,844,323 A | * | 7/1989 | Kondo et al. | ............... 228/121 |
| 4,952,903 A | * | 8/1990 | Shibata et al. | ................. 338/34 |
| 5,023,147 A | * | 6/1991 | Nakata et al. | ................ 428/627 |

(Continued)

FOREIGN PATENT DOCUMENTS

| | | |
|---|---|---|
| DE | 3806153 A1 | 9/1988 |
| DE | 19734211 | 2/1999 |

(Continued)

OTHER PUBLICATIONS

International Search Report and Written Opinion from corresponding Application No. PCT/DE2009/001734.

(Continued)

*Primary Examiner* — Dana Ross
*Assistant Examiner* — Frederick Calvetti
(74) *Attorney, Agent, or Firm* — Hauptman Ham, LLP

(57) ABSTRACT

The invention relates to a method for producing a ceramic-metal connection that is repeatedly subjected to great changes in temperature during use, in which the metal and ceramic are brazed to one another two-dimensionally. Here it is provided that the metal and ceramic are arranged against one another in a monitored manner, preferably in a displacement-monitored manner

4 Claims, 3 Drawing Sheets

(56) References Cited

U.S. PATENT DOCUMENTS

| | | | |
|---|---|---|---|
| 5,175,410 A * | 12/1992 | Freedman et al. | 219/121.63 |
| 6,078,028 A * | 6/2000 | Cooper et al. | 219/270 |
| 6,078,029 A | 6/2000 | Trujillo et al. | |
| 7,342,201 B1 * | 3/2008 | Heuberger et al. | 219/270 |
| 7,441,688 B2 * | 10/2008 | Van Heerden et al. | 228/102 |
| 2003/0164289 A1 * | 9/2003 | Weihs et al. | 204/192.12 |
| 2005/0121499 A1 * | 6/2005 | Heerden et al. | 228/246 |
| 2008/0063889 A1 * | 3/2008 | Duckham et al. | 428/615 |
| 2008/0299410 A1 * | 12/2008 | Duckham et al. | 428/607 |
| 2010/0000982 A1 * | 1/2010 | Allgaier et al. | 219/270 |

FOREIGN PATENT DOCUMENTS

| | | |
|---|---|---|
| DE | 10055910 A1 | 5/2002 |
| DE | 102006016566 A1 | 3/2007 |
| JP | 2008117993 | 5/2008 |
| WO | 01/38254 A1 | 5/2001 |

OTHER PUBLICATIONS

Office Action from corresponding application No. DE 10 2008 061 308.8-24.

Loten in Wikipedia, Aug. 20, 2009, http://de.wikipedia.org/wiki/L%C3%B6ten.

* cited by examiner

ON THE PRODUCTION OF METAL-CERAMIC COMPOUNDS

RELATED APPLICATIONS

The present application is a National Phase of PCT/DE2009/001734, filed Dec. 10, 2009, and claims priority from German Application Number DE 102008061308.8, filed Dec. 11. 2008.

The present invention relates to what is claimed in the preamble and accordingly concerns the connection of metals to ceramic.

Modern high-performance ceramics have many applications in which ceramic material is particularly suitable because it can withstand the great loads particularly well. Typically, for such applications a transition between the ceramic and other materials must be produced, for example in order to fix the ceramic material and/or produce an electrically conducting transition with respect to it. Since materials at such transitions typically differ considerably, it is difficult to produce these transitions inexpensively and durably. This considerably restricts the uses to which ceramics can be applied.

One important application for ceramics such as silicon-carbide ceramics is their use for the production of hot-surface igniters. As a result of the way in which they operate, hot-surface igniters are often subjected to changes in temperature, which leads to particular loads occurring also and especially at terminal areas, because the thermal expansion of the ceramic and the metal of the electrical terminal generally differs.

DE 197 34 211 C2 concerns active brazing alloys. An active brazing alloy is understood in DE 197 34 211 C2 as meaning a brazing alloy that contains a reactive component. If, for instance, an oxide ceramic is brazed, a reactive component is to be understood according to DE 197 34 211 C2 as meaning a component that has a sufficiently great affinity with oxygen. If a material on the basis of carbon is brazed, the reactive component is to be understood as meaning a component that has a sufficiently great affinity with carbon. Then proposed is a method for connecting two ceramics or a ceramic to a metal by a surface of a ceramic being mechanically coated, with Ti, Zr, Hf, V, Cr or Nb, by a rod consisting of Ti, Zr, Hf, V, Cr or Nb or a sheet consisting of Ti, Zr, Hf, V, Cr 30 or Nb being abrasively applied on the surface of the ceramic and the coated surface being brazed to the surface of a further ceramic coated in the same way or to the surface of a metal. It is also mentioned in the document that, in the case of the connection of aluminum oxides to titanium, as brazing conditions, the brazing temperature and the pressure prevailing during the brazing of the substances involved in the reaction should particularly be chosen such that the formation enthalpy of the reactive component is less than the formation enthalpy of the ceramic. A description is then given of an exemplary embodiment in which brazing alloy is placed on the surface to be coated, the metallic object is placed on top and the ceramic is heated together with the metallic object to above 900° C. in a vacuum furnace and subsequently cooled. The significance of the pressure thereby prevailing in the vacuum furnace is mentioned.

U.S. Pat. No. 6,078,028 discloses a method for contacting a hot ceramic element in which an electroconductive ceramic is bonded to an active metal braze and a metal termination is chemically bonded to the active metal braze.

The use of vacuum furnaces in the production of connections is complicated and makes the objects to be produced expensive.

DE 100 55 910 A1 discloses a method for producing a ceramic-metal connection, wherein an active brazing alloy component is applied to the ceramic and the metal to be connected is applied to the surface, and wherein an electric current is made to flow through the transitional area until a desired connection is achieved. In this case, the molten material is intended to be heated to a temperature that is sufficient to reduce oxides and/or oxide films in the contact area. The known method is intended to be performed in ambient air, that is to say in ambient atmosphere.

Although the possibility of creating the connection in ambient atmosphere makes the method according to DE 100 55 910 A1 advantageous, the quality of the corresponding connections can be improved further.

JP 2008-117993 discloses a thermocompression bonding method in which bonding points are produced between semiconductor devices.

It would be desirable to mitigate at least partially some of the problems mentioned.

The object of the present invention is to provide something novel for industrial application.

The present invention consequently proposes in the first basic idea a method for producing a ceramic-metal connection in which metal and ceramic are brazed to one another, it being provided that the metal and the ceramic are arranged against one another in a monitored manner.

A first essential aspect of the present invention has consequently recognized that the connection of ceramic and metal can be made much more stable if they are arranged against one another in a monitored manner during the production of the connection and are not simply pressed against one another just by being arranged one on top of the other or the way in which they are pressed together being largely dictated just by the imponderabilities of the softening of the brazing alloy. The bonding strengths that can be achieved by the invention, obtained when an incoming electrical lead is brazed onto an electrically conductive ceramic, are well above those that can be achieved by the more complicated vacuum brazing technique. This is also the case after repeated heating of the ceramic, and is so even if it is heated to very nigh temperatures, such as significantly above 600° C., and irrespective of the two-dimensional connection between the ceramic and the metal. There is no observed failure through conchoidal fracture or the like, as a result of which an otherwise highly relevant cause of failure is insignificant.

This is probably attributable to the fact that arranging the materials against one another in a monitored manner has the effect that there are no relative movements, or only small relative movements, that would be encouraged by molten brazing alloy as floating or sliding movements, that no brazing alloy is squeezed out between the joint, that brazing alloy is not excessively sucked into capillary openings of a sintered ceramic, and the like. It is by no means necessary and/or ensured however that all these effects specifically contribute to the good properties, and to what extent. All of this contributes to increased reproducibility of the connection.

Aluminum, nickel, zinc, silver, copper, gold, but also technically important alloys, in particular brass, come into consideration in particular as metals. Consequently, connections can be produced in particular for electrotechnical purposes; it should be mentioned that the invention also has applications in other areas; other metals could also be used in such cases. The metals listed as preferred are therefore in no way meant to be restrictive, but merely particularly preferred for the electrical contacting.

Nickel is particularly preferred as a metal, because it is well suited for the production of high-temperature cables, and consequently can be used in particular whenever ceramic hot-surface igniters are to be produced, in particular from silicon-carbide ceramic. It may be used, for example, in the form of a stranded conductor, wire or strip.

The ceramic is typically selected from oxide ceramic and carbide ceramic; however, it should in turn be emphasized that other ceramic materials may likewise be suitable for the invention; heating mechanisms other than direct resistance heating, as preferred for the present invention, particularly when producing silicon-carbide hot-surface igniters, may then be required. In principle, however, it will be appreciated that the use of direct resistance heating of the metal-ceramic transition is particularly preferred, because it is technically easy to implement; to make this type of heating possible, it is particularly preferred if the ceramic is sufficiently electrically conductive. As will be appreciated, a metal-ceramic transition is also referred to moreover in the present case when an active brazing alloy is arranged between the metal and the ceramic, the metal surface and/or ceramic surface additionally undergoes abrasive treatment, as specified for example in DE 197 34 211, or the like.

An active brazing alloy, as known per se in the prior art, is typically used as the brazing alloy. Reference in this respect is made in particular to the prior art documents cited at the beginning, though without any restriction to them.

When active brazing alloy is used, metals which are sufficiently ductile are preferred. In this way it is possible to avoid excessive mechanical loading of the connection produced when it is subjected to changes in temperature. As will be appreciated, thanks to the method according to the invention, the layer of brazing alloy will in this case have a certain (minimum) thickness, so that mechanical stresses and the like that are caused by such changes in temperature are reduced.

In the case of resistance heating, it is particularly preferred to conduct current directly through the metal-ceramic transition that is to be heated; it should be mentioned that other heating methods can also be used, such as for example inductive heating with high-frequency or other electromagnetic alternating fields.

The arrangement of the metal and ceramic against one another will typically take place in a displacement-monitored manner, that is to say metal and ceramic parts will be arranged against one another in a fixed or predetermined position, in particular with a fixed and/or predetermined distance from one another, at least during that phase in which the brazing alloy becomes soft, is soft or molten and/or hardened.

It is preferred to press the metal and ceramic parts against one another with a ram, the ram then being positioned in a displacement-monitored manner while the brazing alloy softens. One of the ceramic and metal parts may in this case be supported on a supporting plate, an anvil or the like, while the ram is placed against the other part. It may be provided that the ram is initially pressed against the parts with a defined pressure, which ensures that, even at the beginning, a current that is adequate for the resistance heating being used can flow, with well distributed current densities. With the softening of the brazing alloy it can then be ensured that the ram is not made to extend indiscriminately, irrespective of the pressing and pressing forces thereby prevailing, bur is held in a displacement-monitored manner. This may take place in various ways. For example, in addition to the pressing pressure, the displacement may be recorded by means of sensors.

In an alternative way, it would also be possible merely to provide an end stop, which limits the amount to which the metal and the ceramic come together to a given, desired value. Such a stop may be made "hard", for example by the movement of the electrode stopping by resting on an abutment, which is preferably adjustable in a way corresponding to the desired thickness of the transitional layer between the metal and ceramic, and/or such an abutment may be made compliant and/or have a given compliance curve, in order to allow a certain (small) residual movement during the softening and so bring about the displaced-distance monitoring.

It should be pointed out that, whenever pressure and displacement sensors are provided, the sensor signals can be taken into consideration in various ways during different phases of the production of the connection; typically in response to the sequence of a specific heating period and/or a specific heating temperature that has already been reached, and possibly measured or concluded from a cur rent-voltage profile etc., the displacement sensor signals largely determine, preferably completely determine, the arrangement of the metal and ceramic against one another. It should be mentioned that, wherever reference is made to pressure sensors, it will be appreciated that it would also be possible for force sensors to be used.

In a preferred variant, at least the connecting location may be flushed or flooded with shielding gas. It is consequently not required in particular for the connection as a whole to be produced in a vacuum. Nevertheless, it would also be possible for the method to be carried out in a vacuum, which may be advisable for individual applications, but is not required for instance in the case of hot-surface igniters of silicon-carbide ceramic.

The metal-ceramic connection is then preferably still held, that is to say fixed, after the heating, until at least cooling down has progressed to the extent that any movement of the metal and the ceramic in relation to one another is at least prevented. This may take place in the given position and/or with allowance for the transitional location to be relieved by moving an electrode ram away.

Also claimed is a device for resistance brazing with at least one ram for arranging ceramic and metal parts to be connected against one another and a ram monitoring means, the ram monitoring means being designed for monitoring a ram position.

In this case, the ram monitoring means make it possible to monitor the ram position during the actual brazing, that is to say at any point in time at which the brazing alloy to be provided between the ceramic and metal is softened or molten.

The device will preferably have a current source, which is able to heat up the metal-ceramic transition by resistance heating. In this respect it will be appreciated that this heating includes the concomitant heating of a brazing alloy to be arranged between the metal and the ceramic. It is not always mentioned in the present case that, whenever reference is made to a ceramic-metal connection, reference could in fact be made more correctly to a metal-brazing alloy-ceramic connection. The current source is preferably designed in such a way that the power outputs and currents required for the direct resistance heating can be made available, in particular with a predeterminable current and/or voltage and/or power-output behavior or profile.

The device may also have shielding gas flushing. Any sufficiently inert gas such as noble gases, possibly nitrogen and the like, may be used as shielding gas. The shielding gas flushing is required whenever the transition is heated; consequently, it is preferred if means for monitoring the shielding gas flow in dependence on the transitional temperature, the duration of heating, etc., are provided in the device, that is to say a permanent stream of shielding gas is not provided.

The ram monitoring means may have a displacement sensor for determining the ram position. Therefore, the displacement by which the ram (on which an electrode is arranged and/or which forms this electrode in the case of resistance heating) has already extended can be recorded. This is particularly preferred because, unlike when only a force sensor is provided, when a displacement sensor is provided it is possible to work without using forces. It should be mentioned that, in addition, a force sensor may be provided in particular for limiting the forces or pressures applied to the metal-ceramic parts as a maximum, and especially before the beginning of heating.

Accordingly, in the preferred variant, the displacement signal or position signal that is preferably to be provided is recorded in addition to other sensor signals, in particular force sensor signals, and used for controlling the method sequence; that this control can typically take place by a programmable controller or the like, that is to say in a programmed way, should be mentioned.

It should also be mentioned that the actual electrode surface to be provided on the ram may be shaped so as to complement the geometry of the parts to be connected. This is particularly easy when graphite is used for the electrode, since graphite can be worked well, and consequently can be contoured well.

Alternatively and/or in addition, a ram brake may be provided for limiting the ram movement. This may be actuable by a controller, for example pneumatically or electrically, and so limit a ram movement, and consequently the maximum ram pressure, and/or a simple stop, which in particular is adjustable, may be provided.

The device according to the invention can be used in particular for implementing the method according to the invention. This also applies to the respectively preferred embodiments of the device and the method.

With the arrangement according to the invention or the method according to the invention, silicon-carbide hot-surface igniters can be produced well in particular. Protection is also claimed for these igniters.

In a particularly preferred variant of the metal-ceramic composite parts produced according to the invention, in particular in the case of silicon-carbide hot-surface igniters, a sufficiently thick layer of brazing alloy is provided between the ceramic surface and the metal that is actually to be connected to it. For instance, a layer of brazing alloy may have a thickness of, for example, between 0.2 mm, preferably at least 0.4 mm, and 1 mm, preferably no more than 0.8 mm. The thickness range from 0.6 mm to 0.8 mm of active brazing alloy is particularly preferred especially in the case of ductile active brazing alloys, such as aluminum, especially pure aluminum. In this case, stresses can be absorbed sufficiently well. The method according to the invention contributes to the layer thickness being adequate. It should be pointed out that a ceramic part to be connected according to the invention may be prepared by applying a metallization; reference may be made to the methods mentioned in DE 197 34 211, such as CVD, PVD, abrasive treatment, flame spraying, sputtering and the like.

The invention is described below just by way of example with reference to the drawing, in which.

Figure 1A:
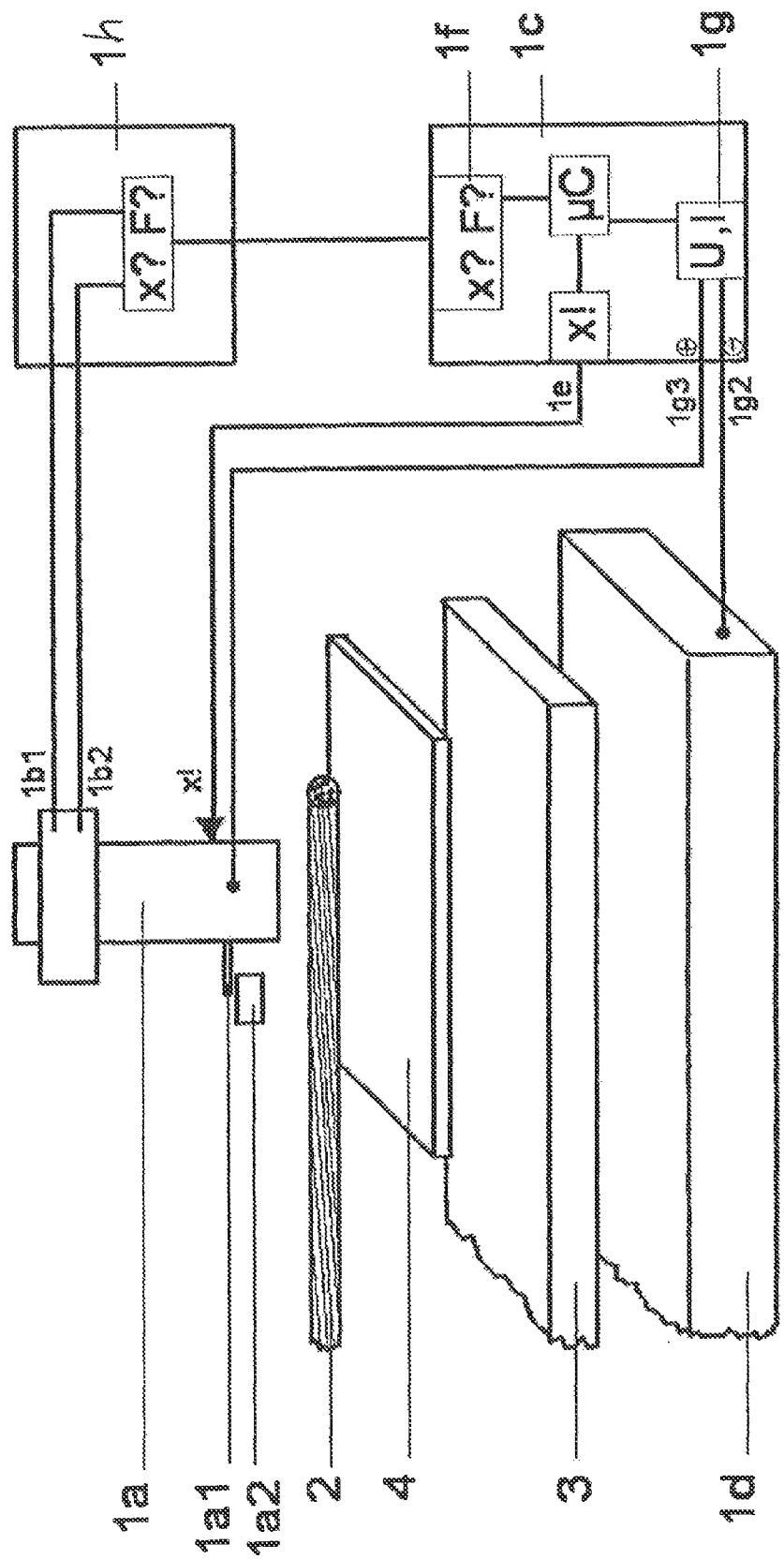
FIG. 1a shows the device according to the present invention for implementing a method according to the invention in a schematic representation.

According to FIG. 1a, a device 1 that is denoted generally by 1 and is suitable for connecting a metal 2 to a ceramic 3 by brazing alloy 4 comprises a ram 1a and a ram monitoring means 1b1, 1c, which is designed for monitoring a ram position x, compare reference numeral 5.

Figure 1B:
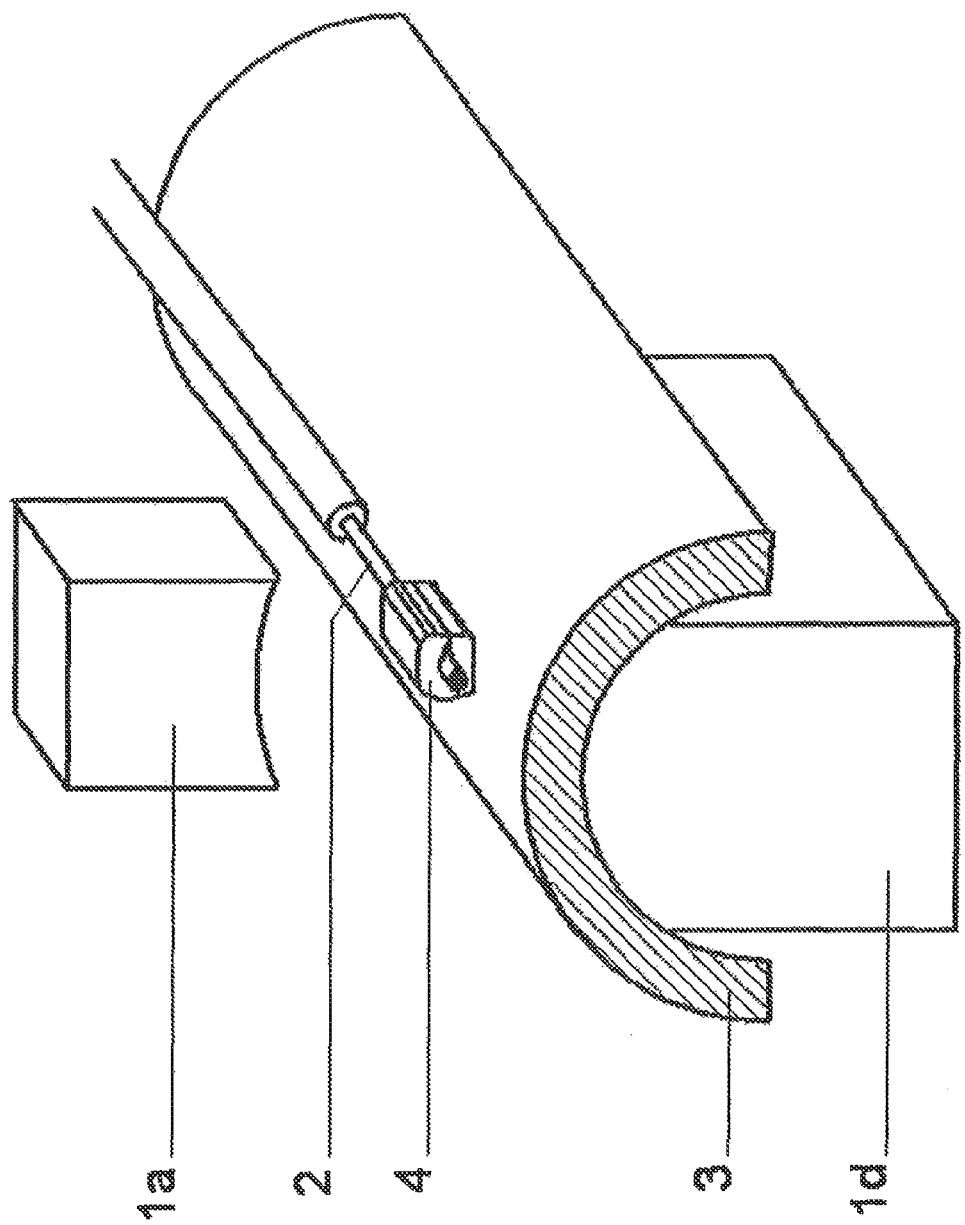
FIG. 1b shows the workpiece-contacting parts of the device in a three-dimensional representation, with a piece of brazing alloy wrapped around the metal.

In the present exemplary embodiment, the device 1 is provided with a controller 1c, which controls the sequence of the production of the connection, as still to be explained. In the case of the electrode ram 1a, the device has for this purpose a displacement sensor 1b1 and a force sensor 1b2, with which the pressing force of the electrode ram against the placed-together metal-ceramic parts that are to be joined and are lying on a counter electrode Id are pressed. It will be appreciated that the representation in FIG. 1 does not show the parts lying directly one on top of the other but instead, for reasons of overall clarity, arranged one above the other in a schematic exploded drawing.

Monitored by the controller 1c, in the present case the electrode ram 1a can be moved, for which purpose a pneumatic or electromotive actuator (not shown) is provided and can be actuated in response to control signals 1c in order to extend the ram 1a by a certain distance x. The controller 1c is provided with a microcontroller, in order to generate for this purpose a control signal for the actuator control output 1e. The controller 1c also has a sensor input 1f, into which sensors 1b1, 1b2 feed signals, which in turn record the current distance displaced and the current pressing pressure with which the electrode ram is pressed onto the material assembly that is to be joined and is resting on the counter electrode 1d. The pressure sensor 1b2 may be conventionally formed, for example with strain gages; it goes without saying that, instead of a pressing pressure, the total force which the ram electrode exerts may be determined; no distinction in this respect is made any more in the present case.

The displacement sensor 1b1 may likewise be formed as a conventional displacement sensor, for example by means of an inductively coupled pushrod, by optical scanning of a line pattern or other pattern, by interferometric length measurement or the like. It goes without saying that suitable signal conditioning 1h is provided for the respective sensors, conditioning which is likewise not described in any more detail here and either conditions the sensor signals before they are fed into the controller 1c and/or performs such conditioning within the controller 1c.

The controller 1c is further designed for the purpose of conducting a current required for resistance brazing into the counter electrode Id via the ram electrode 1a, the metal 2, the brazing alloy 4 and the ceramic 3. For this purpose, the controller 1c has a power source 1g. On account of the ohmic resistance of the individual elements in the circuit, heating thereby takes place, heating which is adequate for producing the brazed connection provided that the current is sufficiently great; depending on whether the heating takes place predominantly in the brazing alloy 4 or elsewhere, for example in the ceramic 3 or in additional heating elements (not shown) in the counter electrode, the ram electrode etc., it is known as direct or indirect resistance heating. The controller 1c is designed, in such a way that a current or a voltage that is adequate for the heating of the respective parts is provided. It should otherwise be pointed out that heating by resistance heating is not obligatory and that the heating could possibly also be performed in some other way, for example by inductive heating of the brazing alloy 4 or the like. The power source 1g for electrical power is connected via lines 1g2, 1g3 to the electrodes 1a and 1b, which, as will be evident from the above, are electrically conductive and, moreover, can readily withstand the loads that are to be expected. For this purpose, they are sufficiently heat-resistant with regard to the temperatures required for heating the brazing alloy that is provided and are solid enough to absorb the forces that are to be expected.

In FIG. 1, the power source 1g is shown with a positive and a negative output terminal; this especially serves the purpose of quickly indicating to the viewer of the figure that an electrical power source is provided here, but is not intended to restrict the invention to the use of direct current. A person skilled in the art will understand that any form of (electrical) power that is suitable for bringing about the required heating is suitable for the purposes of the invention.

The movable electrode ram 1a has a radially projecting stop element 1a1, which is intended to stop against a support 1a2 serving as an extension limitation. When the stop element 1a1 lies against the support 1a2, it will be appreciated that further displacement of the electrode ram 1a in the direction of the counter electrode is no longer possible.

The metal 2 is in the present case a stranded nickel conductor that is insulated for high-temperature purposes (insulation not shown since it has been removed in the connecting region), as already used for example for commercial hot-surface igniters and the like.

The ceramic 3 is in the present case a hot-surface igniter body 3 of suitably produced silicon-carbide ceramic. Such hot-surface igniter bodies are known per se and need not be described any further here. It will be appreciated that the exact geometry of the hot-surface igniter differs distinctly from the only schematically represented, somewhat plate-like form of FIG. 1. In the case of an actual hot-surface igniter, contacting is only provided in a certain region away from the zone of greatest heating.

The counter electrode 1d is shaped so as to complement the contour of the hot-surface igniter 3, in order to make it possible for the hot-surface igniter to rest on it without great loading at discrete points. The counter electrode 1d is therefore shown in the present case as a planar surface area. It should be pointed out that the ram 1a is also shaped in a complementary form, to be precise in turn in relation to the ceramic part, cf. for instance the three-dimensional representation of FIG. 1b, and/or in relation to the form of the stranded nickel-wire conductor, that is to say the metal part 2. It should be mentioned that this metal part may be surrounded with brazing alloy, cf. FIG. 1b or FIG. 2. It will be appreciated that the counter electrode 1d may be stationary and only the ram electrode 1a moves. However, this is not absolutely necessary; rather, two electrodes that are movable with respect to one another and movable in relation to a machine housing may also be provided; it is also not necessary for the ram electrode to be arranged toward the metal.

An opposite arrangement would also be conceivable, an arrangement such that the displacement-controlled, movable electrode ram would rest on the ceramic part. It should be pointed out that the metal part 2 is shown as a "bare" wire. This is not mandatory, however; the metal to be contacted may, for example, also be provided with a sleeve. In particular, it is possible to enclose or surround the stranded conductor in advance with a brazing alloy, to prepare the ceramic, at least at the connecting location, for example by spraying on suitable activating materials such as by flame spraying, CVD application, PVD application, etc., in each case of sufficiently reactive materials such as aluminum, abrasive application of metals as known from the prior art, etc. Although the invention is preferred for ceramic hot-surface igniters, this is not mandatory and it will be appreciated by a person skilled in the art that the invention can be used with many combinations of materials.

In the present case, the brazing alloy 4 is a suitable active brazing alloy. Particularly preferred as the active brazing alloy is one which is sufficiently ductile to absorb well the stresses produced as a result of the different thermal expansions of metal and ceramic in the case where the parts to be connected are heated, or when they are subjected to changes in temperature (in particular after the production of the connection, during which the parts are heated particularly greatly and subsequently cooled to room temperature). A particularly suitable active brazing alloy is aluminum, in particular sufficiently pure aluminum. The brazing alloy is provided in a sufficient thickness. It should be mentioned that, although the drawing is not to scale, a brazing alloy thickness of between 0.2 mm, preferably at least 0.4 mm, in particular 0.8 mm, is used for typical applications. Greater brazing alloy thicknesses scarcely yield any advantages with regard to the absorption of mechanical stress, while brazing alloy thicknesses that are too small do not sufficiently absorb mechanical stress when subjected to changes in temperature.

The support 1a2 has an adjustable stop position, the stop position being adjustable in relation to an initial position of the electrode ram. In other words, the support 1a2 can be positioned in such a way that the electrode ram already resting on the assembly comprising the metal part, brazing alloy and ceramic can only be moved by a predetermined maximum displaced distance. The stop does not necessarily have to be provided if some other displaced-distance limitation is provided. It may be provided as an alternative to sensor-based displaced-distance recording and is only described here in the same exemplary embodiment for reasons of more complete explanation of the invention, without there being any need, as mentioned, for a number of different displaced-distance limiting means to be realized in one exemplary embodiment.

The controller 1c is designed in the present case for the purpose of recording the force exerted by the electrode ram 1a and the travel of the electrode ram 1a and for controlling the travel of the electrode ram 1a, as well as for predetermining a suitable current-flow curve of the current flow for a resistance heating. In addition, depending on the degree of automation, other operations could also be controlled, for example the material delivery or the like.

The device is used as follows:

Firstly, the parts to be connected are arranged one above the other and placed onto the counter electrode 1d, that is to say the ceramic 3, a piece of brazing alloy 4 and the metal part 2 that is to be brazed onto the ceramic element 3 in the form of the bared end of a stranded nickel-wire conductor lie on the counter electrode.

Then, the ram 1a is moved up against the metal part 2, initially without any pressure. The initial position is determined as the zero position. The support 1a2 for the stop 1a1 is adjusted such that the electrode ram 1a can still be moved away from this position by a maximum displaced distance 5, until it comes to a stop. It should be pointed out that, with sufficiently constant dimensions of the ceramic, brazing alloy and metal part, such adjustment cannot be performed for each workplace, but specifically when sensor recording of the zero position is possible a zeroing of connecting part to connecting part is clearly preferred.

Downward pressing of the electrode ram is then commenced. The maximum force that can be applied is limited, in order to avoid destruction of the workpieces. This is possible by the pressure measurement. The current for resistance heating is then switched on and the parts begin to heat up. At the same time, shielding gas flushing may take place, the shielding gas supply not being shown for reasons of overall clarity.

With the heating, the brazing alloy 4 begins to soften, which leads to the ram 1a being able to move downward. This is recorded as a decrease in pressure or as a downward movement and, in response to this, the pressing force is reduced. At the same time, if required, the heating power can be changed, in order to obtain a suitable heating-up curve in which the parts are not heated excessively quickly and, moreover, there is still time for the correction of the electrode ram movement.

The brazing alloy is then softened further and the desired connection is produced; as this happens, the force with which the electrode ram 1a presses against the counter electrode is reduced, to be precise possibly to virtually zero. This is achieved by the position of the ram electrode being kept at a setpoint value. This in turn prevents brazing alloy 4 from being pressed out of the region between the metal part 2 and the ceramic part 3, Therefore, brazing alloy 4 also remains present in a certain layer thickness between the metal part 2 and the ceramic part 3 on account of the capillary forces. The further movement of the electrode ram may, moreover, take place for example by removing the pressing force, but for example also by suitable arrestment, such as a pneumatic brake, an electromagnet that is excited in the warm phase and fixes the electrode ram or keeps it away, or the like.

In the case where the control or the arrestment fails, the electrode ram 1a will rest with its stop 1a2 on the support 1a2, to be precise at such a distance that a sufficient thickness of brazing alloy likewise still remains between the metal 2 and the ceramic 3.

As will be appreciated and has already been mentioned, it is possibly sufficient for one of the measures to be implemented.

After the softening, which may be recorded for example by the force-displacement behavior and the recording of the current-voltage characteristic at the controller 1c, and the continuation of the production of the connection, which can likewise be recorded in this way, the current can be switched off and a holding phase allowed to take its course. This may be determined for example by the elapse of a specific time and/or by temperature sensors (not shown).

After the elapse of the holding time, the electrode ram is returned to its starting position, in which it is lifted off from the now connected composite part and the composite part can be removed.

The connections obtained in this way are of a reproducibly high quality. Stripping forces, that is to say forces that have to be applied to remove the metal part from the ceramic, better by a factor of about 2 than those that can be obtained by conventional vacuum brazing are achieved. It should be mentioned that the controller 1c can operate in a program-controlled manner and that a corresponding running program for a microcontroller or the like may be provided.

A metal-ceramic hot-surface igniter produced in this way has a thick layer of brazing alloy between the metal and the ceramic, allowing it to be frequently subjected to changes in temperature without the risk of being destroyed, without production in a vacuum being required for this.

The method described and the device described are only given by way of example. As important variants, mention should be made of the following, without being restrictive:

Other than as mentioned above, the heating of the connecting location does not have to take place by current flowing through the metal, brazing alloy and ceramic via the electrodes and, on account of the resistance, thereby primarily bringing about the layer with the greatest voltage drop, typically therefore in the brazing alloy itself. Rather, it would also be possible for example to connect the metal directly to a voltage source; in that case, the incoming and outgoing leads could both be provided on the metal, whereby in any event the metal heats up and the brazing alloy and the ceramic are concomitantly heated by the metal; it should be mentioned that, alternatively and/or in addition, a connection of the electrically conductive ceramic (which indeed is typical specifically in the area of hot-surface igniters) to the current source used for heating may be performed. Furthermore, it should be mentioned that, alternatively and/or in addition, heating may also be brought about by the electrodes; in this case, the electrodes are heated, or a heating area arranged on them, For this purpose, a heating element may be provided at a suitable location, for example in the form of an electrode shoe. A heating element may be in particular be formed itself from electrically conductive ceramic.

Other than as described above, the piece of metal realized here by nickel wire need not merely rest on a piece of metal. The metal to be connected to the ceramic may also be embedded in the brazing alloy material, for example by a strip of the brazing alloy material being beaten or placed around the end of the metal to be connected and/or a piece of brazing alloy material being provided with a clearance, for example in the form of a tube, and the metal to be connected being introduced into the clearance. In this case, the brazing alloy material may be (mechanically pre-)connected to the metal, for example by squeezing or crimping, which ensures that the brazing alloy and metal do not come apart during handling. Such handling is shown for example in FIG. 1b, it also being evident in this figure that the ram electrode—in just the same way as the counter electrode—is adapted to the contour of the ceramic part to be connected.

Figure 2:
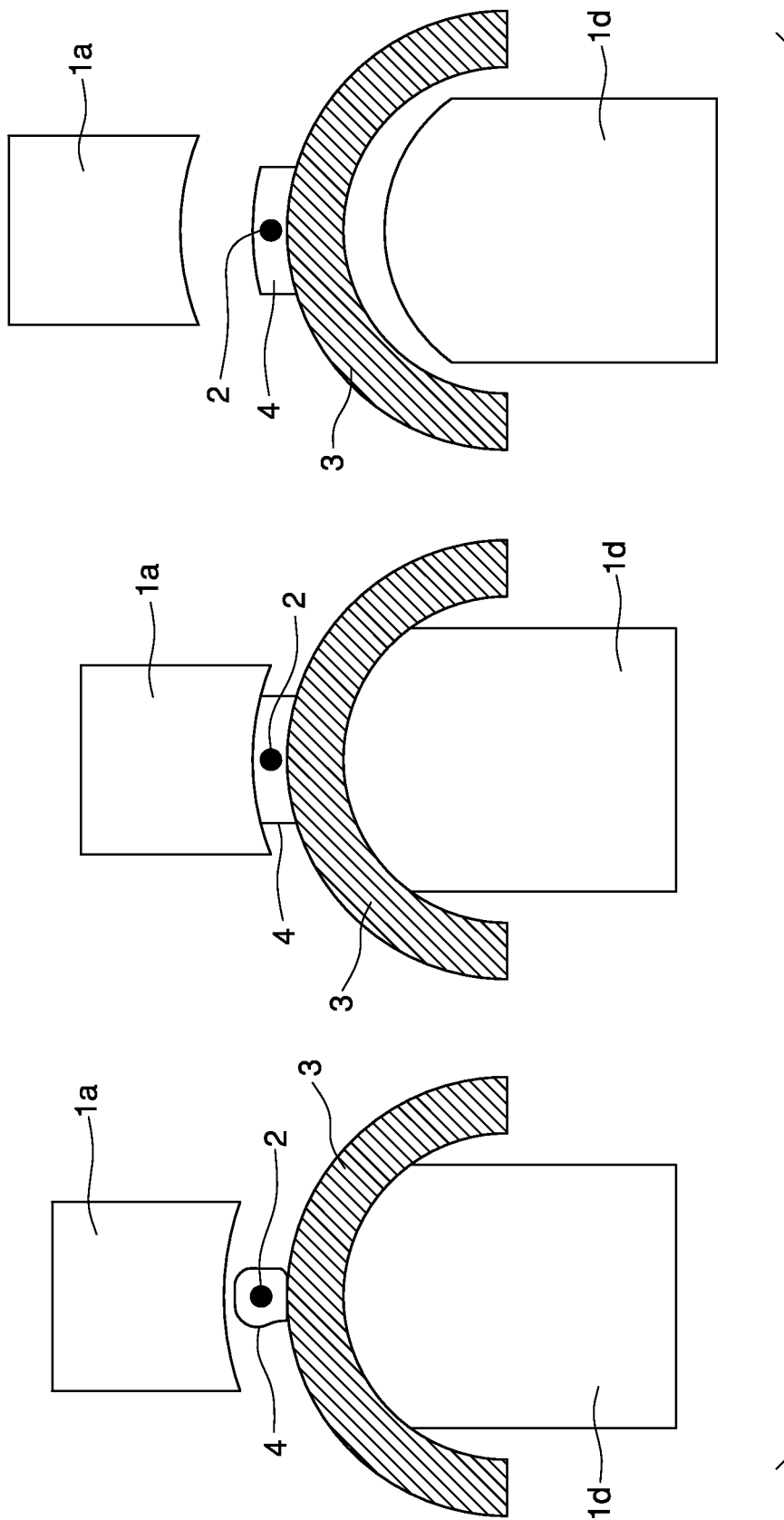
FIG. 2 shows three phases of the production of a connection according to the invention.

This can also be seen in the sectional view of FIG. 2, where three phases of the production of the connection are shown in section, that is to say phase I before electrode approach, phase II during melting and phase III after completion of the operation.

It should be mentioned that the connecting methods disclosed here, on the basis of which ceramic and metal are connected by brazing alloy in a displaced-distance-monitored manner, can also be used for a series of other material pairings. Ceramic-ceramic connections and metal-metal connections should be particularly mentioned, a layer of brazing alloy being provided in each case—as is evident from the above. In the case of a metal-metal connection, the method is particularly advantageous wherever at least one of the metal softens greatly, because, on the basis of the displacement monitoring according to the invention, deformation by further pressing down of the (electrode) ram or pressing together of a ram against a support is thereby avoided. It should also be pointed out that the combination of force monitoring and displacement monitoring offers advantages not only in the case of softening materials, but rather also wherever the force initially has to be limited in order to avoid workpiece destruction. Here it may be provided that a certain corrective adjustment is performed during initial softening and only then does displacement monitoring limit further corrective adjustment. This allows good connections to be produced in the case of breakable or brittle materials such as glass and the like, without a high pressure being exerted at the beginning, and allows the thickness of the brazing alloy to be adjusted well, i.e. under open-loop and/or closed-loop control. Against this background, it will be evident that the invention is suitable for connecting to one another at least, two materials that are respectively selected from the group comprising metal, in particular metal that softens under brazing heat, glass, plastic, in particular thermoplastic, and ceramic. That other as brazing methods may be used in individual cases with displacement-monitored arrangement of one material against the other should likewise be mentioned.

Other than as represented, the connection does not necessarily have to be produced with shielding gas flooding. Depending on the material pairing, it is also possible to perform a connection in air or else, in the case of particularly sensitive materials, in a vacuum. While it will be appreciated from the above that this is not mandatory for metal-ceramic connections, there are metal pairings that can be better connected in this way or can only be connected in this way. Instead of shielding gas flooding with inert or largely inert gases, it is also possible to perform flushing or flooding with reactive fluids, for instance to encourage a connection by chemical attack of the heated surface or the like. This in turn applies to all material pairings.

The invention claimed is:

1. A method for producing a metal-brazing alloy-ceramic connection that is repeatedly subjected to changes in temperature in excess of 600° C. during use, in which the metal and ceramic are brazed to one another two-dimensionally using an active ductile brazing alloy by heating the metal, the ceramic and the active ductile brazing alloy, characterized in that the metal and ceramic are arranged against one another in a displacement controlled manner in a non-vacuum atmosphere; and wherein the metal and alloy are selected from the group consisting of aluminum, nickel, zinc, silver, copper, gold and mixtures thereof and brass, and wherein the ceramic is selected from oxide ceramic and a carbide ceramic materials; and wherein the metal and ceramic are pressed against one another in a displacement controlled manner at a predetermined distance from one another during that phase in which the active ductile brazing alloy becomes soft, is soft or molten and/or hardened, while preventing active ductile brazing alloy from being pressed out of the region between the metal part and the ceramic part, to thereby provide a layer of active ductile brazing alloy with a minimum thickness of 0.2 mm and maximum thickness of 1.0 mm; and wherein the metal-brazing alloy-ceramic connection is fixed after heating until cooling down has progressed to the extent that any movement of the metal and the ceramic in relation to one another is prevented.

2. The method according to claim 1, characterized in that the metal-ceramic transition is heated by resistance heating being sent directly through the metal-ceramic transition that is heated.

3. The method according to claim 1, characterized in that the metal-ceramic parts are pressed against one another with a ram and, during softening of the brazing alloy, the ram is positioned in a displacement-monitored manner, in order to achieve the monitored arrangement of the metal and ceramic against one another and to press the metal-ceramic parts against one another with a predetermined pressure and predetermined force before substantial softening of the brazing alloy and to make the metal-ceramic parts cool down in a given position determined in a displacement-monitored manner.

4. The method according to claim 3, characterized in that the connecting location is flooded with a shielding gas.

* * * * *